US011140586B2

(12) United States Patent
Sivavakeesar et al.

(10) Patent No.: US 11,140,586 B2
(45) Date of Patent: Oct. 5, 2021

(54) SETUP OF BASE STATION CONNECTION TO WLAN

(71) Applicant: NEC Corporation, Tokyo (JP)

(72) Inventors: Sivapathalingham Sivavakeesar, Milton Keynes (GB); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/301,062

(22) PCT Filed: May 10, 2017

(86) PCT No.: PCT/JP2017/017713
§ 371 (c)(1),
(2) Date: Nov. 13, 2018

(87) PCT Pub. No.: WO2017/195832
PCT Pub. Date: Nov. 16, 2017

(65) Prior Publication Data
US 2019/0261231 A1 Aug. 22, 2019

(30) Foreign Application Priority Data
May 13, 2016 (GB) .................................... 1608492

(51) Int. Cl.
H04W 36/00 (2009.01)
H04W 36/14 (2009.01)
H04W 92/02 (2009.01)

(52) U.S. Cl.
CPC ... *H04W 36/0066* (2013.01); *H04W 36/0061* (2013.01); *H04W 36/14* (2013.01); *H04W 92/02* (2013.01)

(58) Field of Classification Search
CPC ......... H04W 36/0016; H04W 36/0061; H04W 36/0066; H04W 36/08; H04W 36/14;
(Continued)

(56) References Cited

U.S. PATENT DOCUMENTS

2011/0013587 A1 1/2011 Serravalle
2015/0351115 A1 12/2015 Jeon et al.
2016/0302122 A1* 10/2016 Masini .................. H04W 36/14

FOREIGN PATENT DOCUMENTS

WO 2014/087235 A2 6/2014
WO 2015/115953 A1 8/2015

OTHER PUBLICATIONS

3GPP TS 36.300 V13.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Mar. 2016, 295 pages.
(Continued)

*Primary Examiner* — Pao Sinkantarakorn
(74) *Attorney, Agent, or Firm* — Sughrue Mion, PLLC

(57) ABSTRACT

A system is disclosed in which a base station performs an Automatic Neighbour Relation (ANR) operation in relation to a Wireless Local Area Network (WLAN) and obtains, from a mobile communication device (UE) or a Mobility Management Entity (MME), the Transport Network layer (TNL) address associated with a WLAN Termination node of the WLAN for establishing a connection between the base station and the WLAN Termination node.

12 Claims, 9 Drawing Sheets

(58) Field of Classification Search
CPC ... H04W 92/02; H04W 92/04; H04W 92/045; H04W 92/06; H04W 92/12; H04W 92/20
See application file for complete search history.

(56) References Cited

OTHER PUBLICATIONS

3GPP TSG-RAN WG3 Meeting #91, R3-160345, "The Importance of WT Address Look-Up," Ericsson, Feb. 15-19, 2016, 4 pages.
3GPP TSG-RAN WG3#91, R3-160323, "WT address look-up for automated Xw-C Setup," Nokia Networks, Alcatel-Lucent, Alcatel-Lucent Shanghai Bell, Feb. 15-19, 2016, 5 pages.
3GPP TSG-RAN WG3 Meeting #91, R3-160545, "Xw Dynamic Configuration," Ericsson, Feb. 15-19, 2016, 3 pages.
3GPP TS 36.413, V13.2.0, 3rd Generation Partnership Project; Technical Specification Group Radio Access Network; Evolved Universal Terrestrial Radio Access Network (E-UTRAN); S1 Application Protocol (S1AP) (Release 13), Mar. 2016, 321 pages.
3GPP TS 24.302, V.13.5.0, 3rd Generation Partnership Project; Technical Specification Group Core Network and Terminals; Access to the 3GPP Evolved Packet Core (EPC) via non-3GPP access networks; Stage 3 (Release 13), Mar. 2016, 126 pages.
3GPP TSG-RAN3 Meeting #91bis, R3-160920, "Way Forward on ANR for LWA," Intel Corporation, Apr. 11-15, 2016, 2 pages.
3GPP TSG-RAN2 Meeting #93bis, R2-162464, "ANR aspects of LWA," Intel Corporation, Apr. 11-15, 2016, 6 pages.
British Search Report issued in GB 1608492.3 dated Oct. 3, 2016.
Written Opinion of the International Searching Authority of PCT/JP2017/017713 dated Jul. 12, 2017.
International Search Report of PCT/JP2017/017713 dated Jul. 12, 2017.
3GPP TSG RAN WG3 Meeting #94, "WT Notifying neighbour eNB information on Xw", R3-162897, Nov. 14-18, 2016, (12 pages total).
3GPP TSG-RAN WG3 Meeting #89bis,"ANR process in LWA", Alcatel-Lucent, Alcatel-Lucent Shanghai Bell, R3-152055, Oct. 5-9, 2015, (4 pages total).
3GPP TSG RAN WG3 Meeting #94,"How a Source determines Connectivity to the Same WT in inter-eNB HO?", R3-162896, Nov. 14-18, 2016, (3 pages total).
Communication dated Oct. 23, 2019, from the Japanese Patent Office in application No. 2018-555785.
Communication dated Jul. 31, 2020, issued by the China National Intellectual Property Administration in application No. 201780029750.3.
Catt, "Discussion on ANR for LWA", 3GPP TSG RAN WG3 Meeting #91bis, R3-160613, Bangalore, India, Apr. 11-15, 2016, pp. 1-4.
EP Office Action for EP Application No. EP17726714.3 dated Dec. 18, 2020.
Alcatel-Lucent et al: "ANR process in LWA", 3GPP Draft; R3-152710, 3GPP TSG-RAN WG3 Meeting #90 , Nov. 16, 2015, pp. 1-4, XP051007579.

* cited by examiner

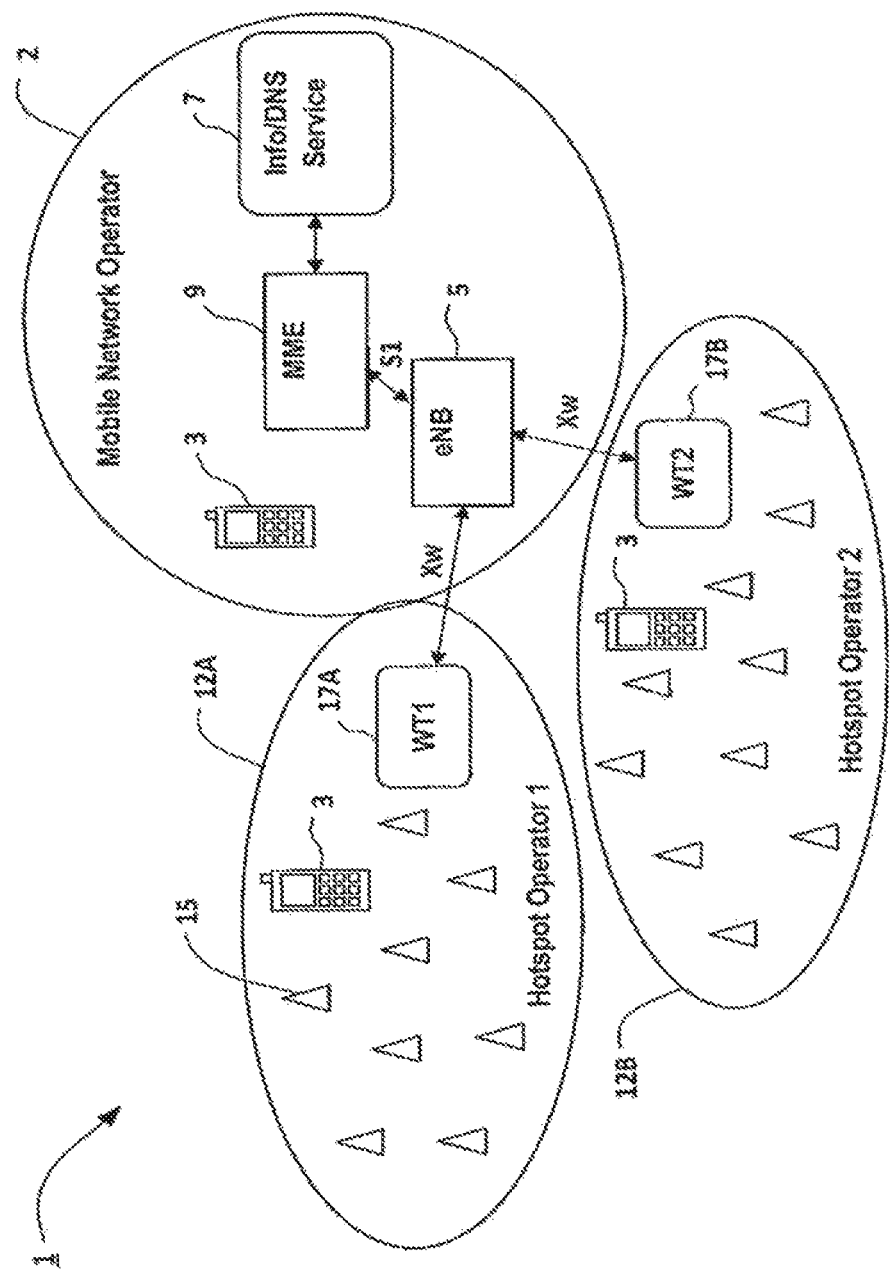
[Fig. 1]

[Fig. 2]
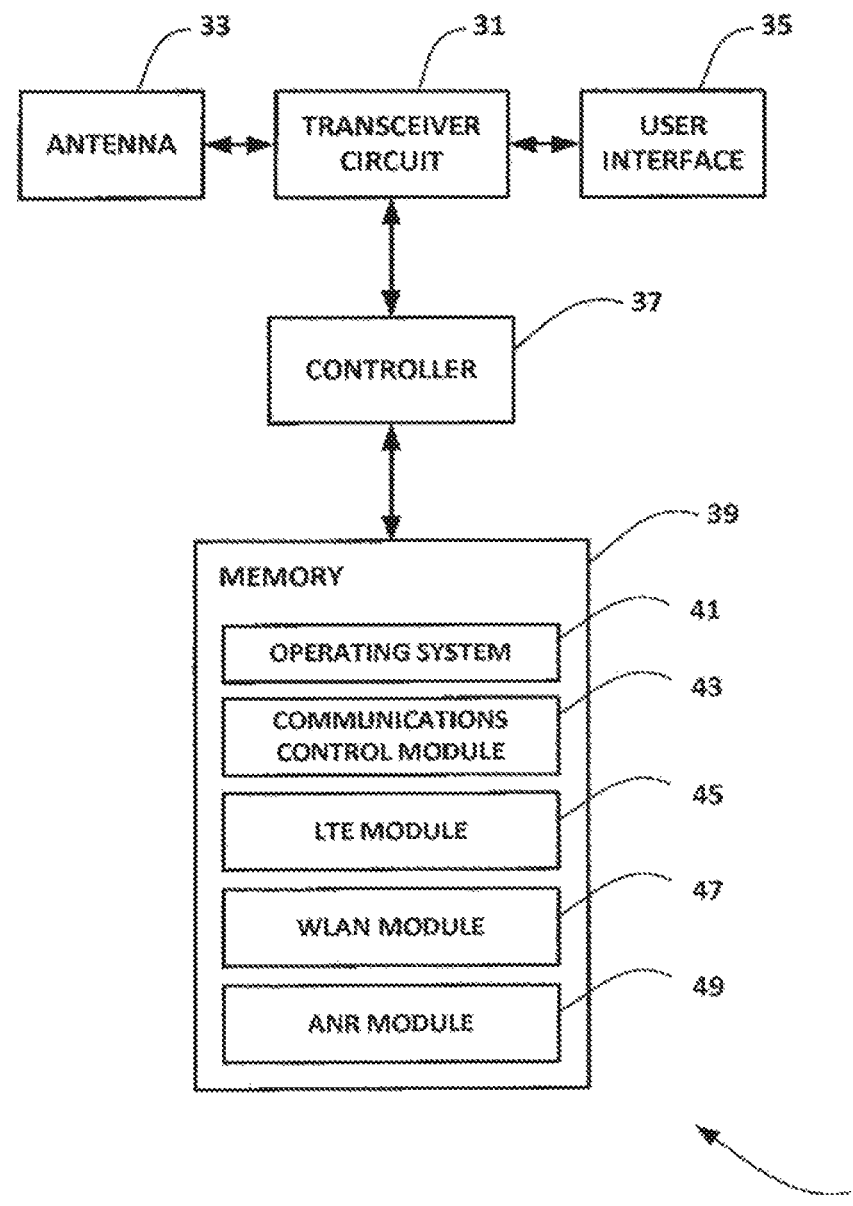

[Fig. 3]
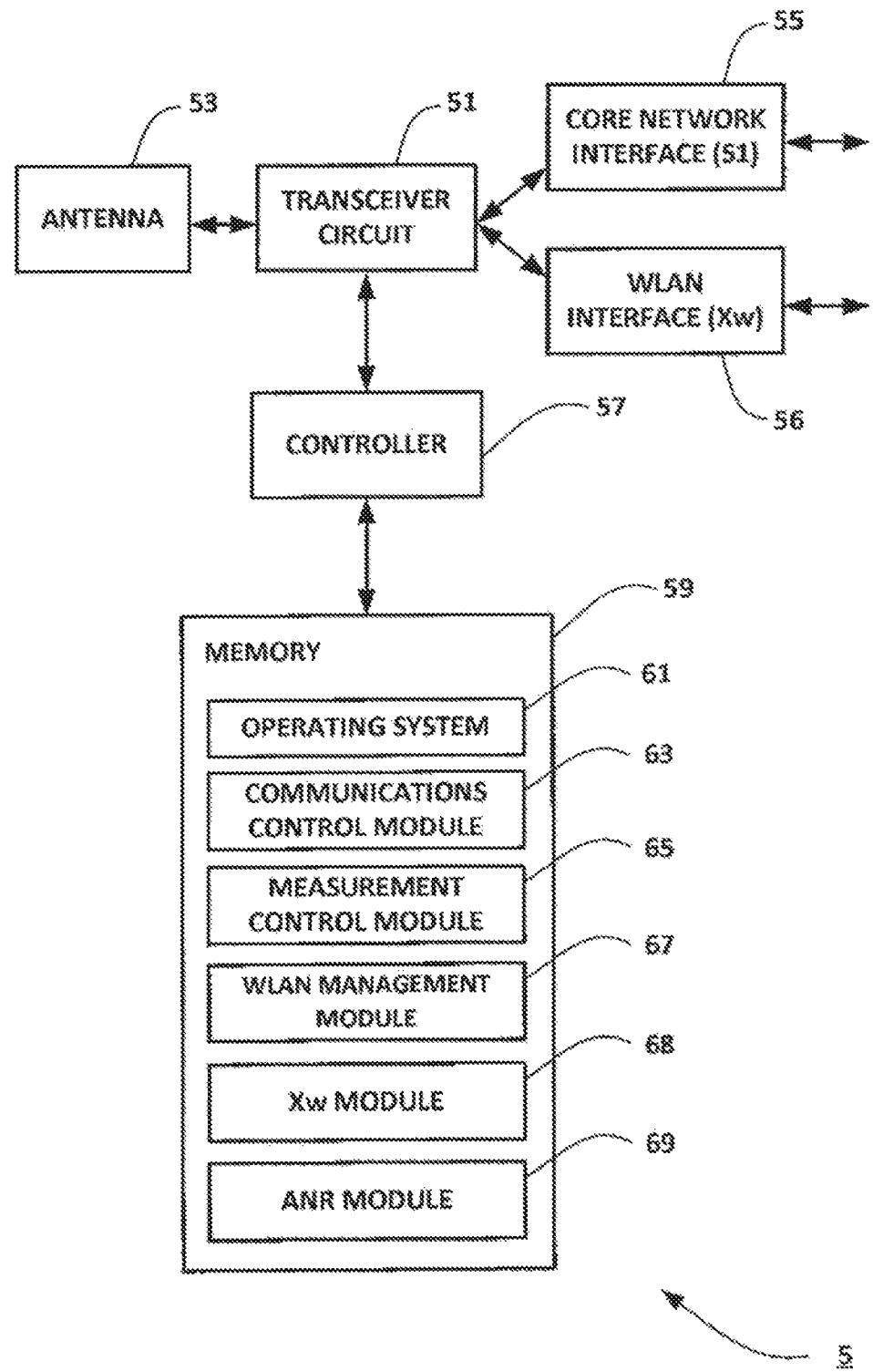

[Fig. 4]
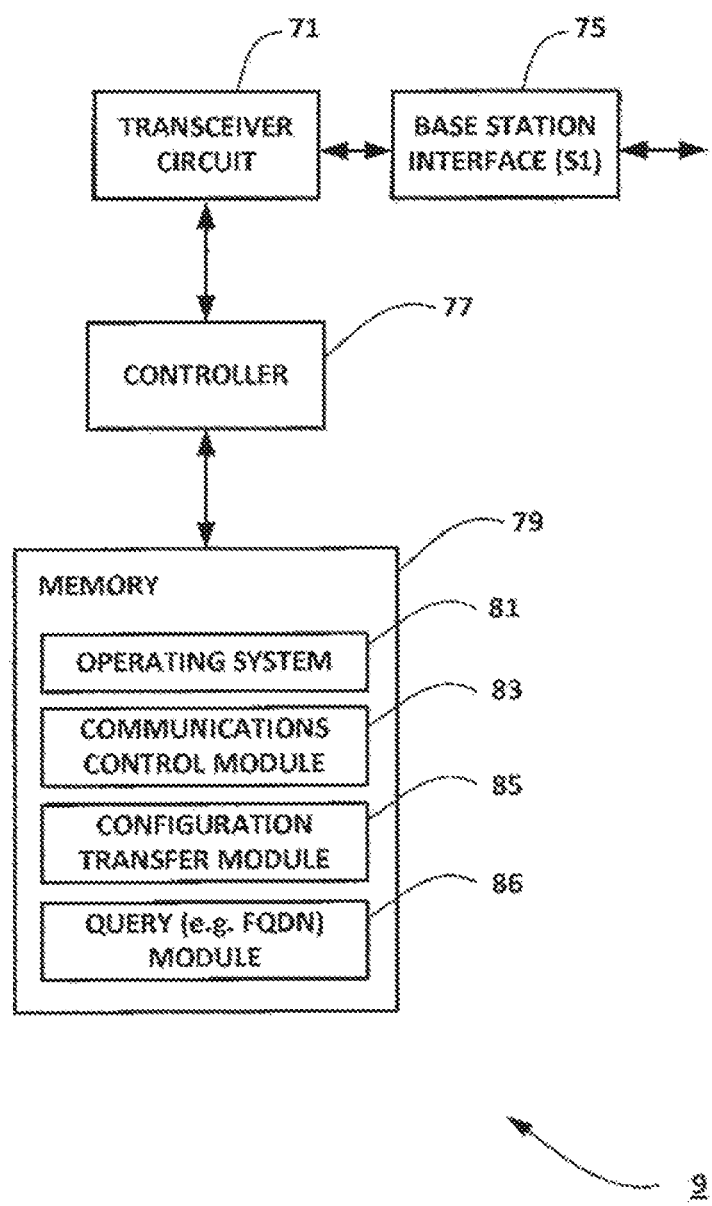

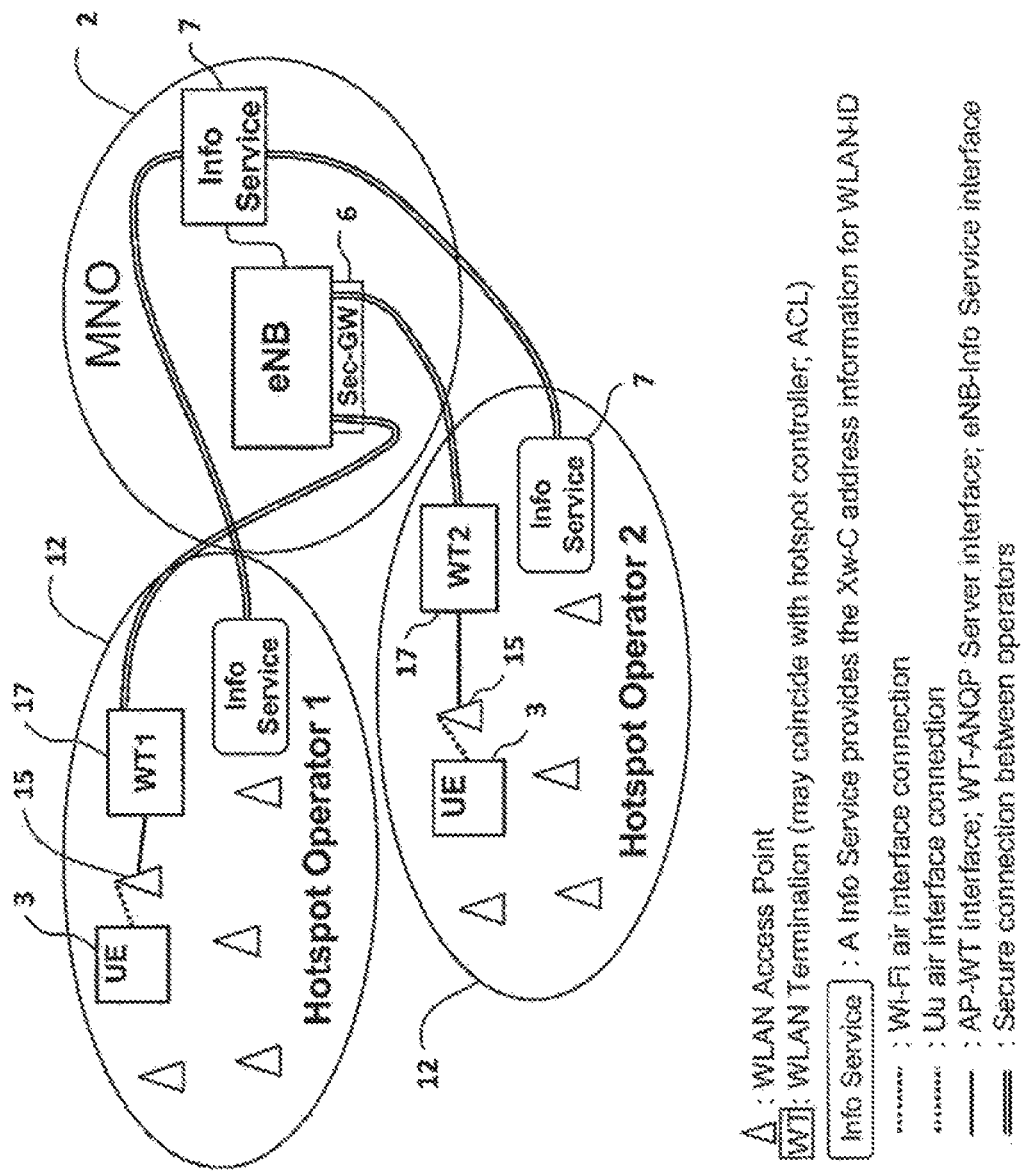
[Fig. 5]

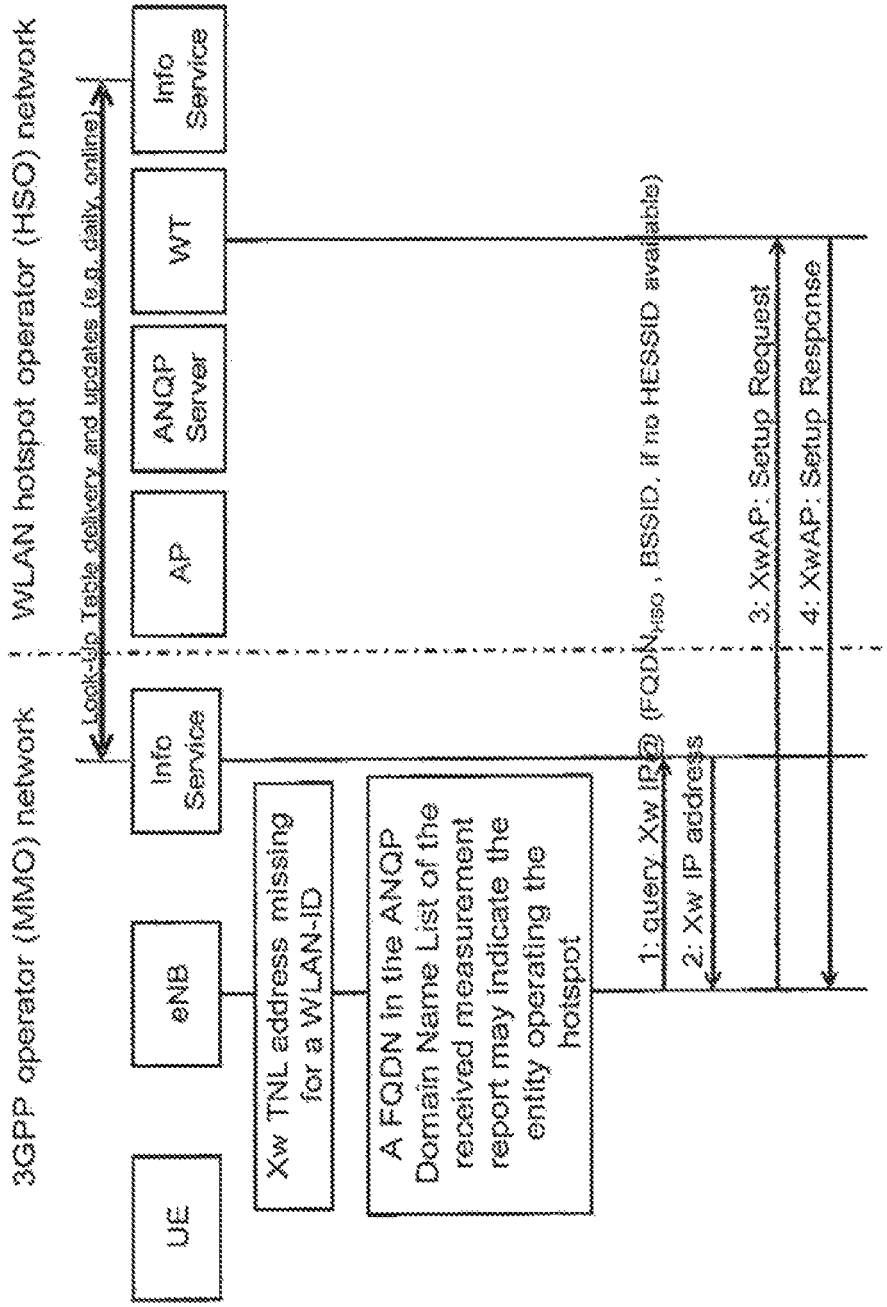

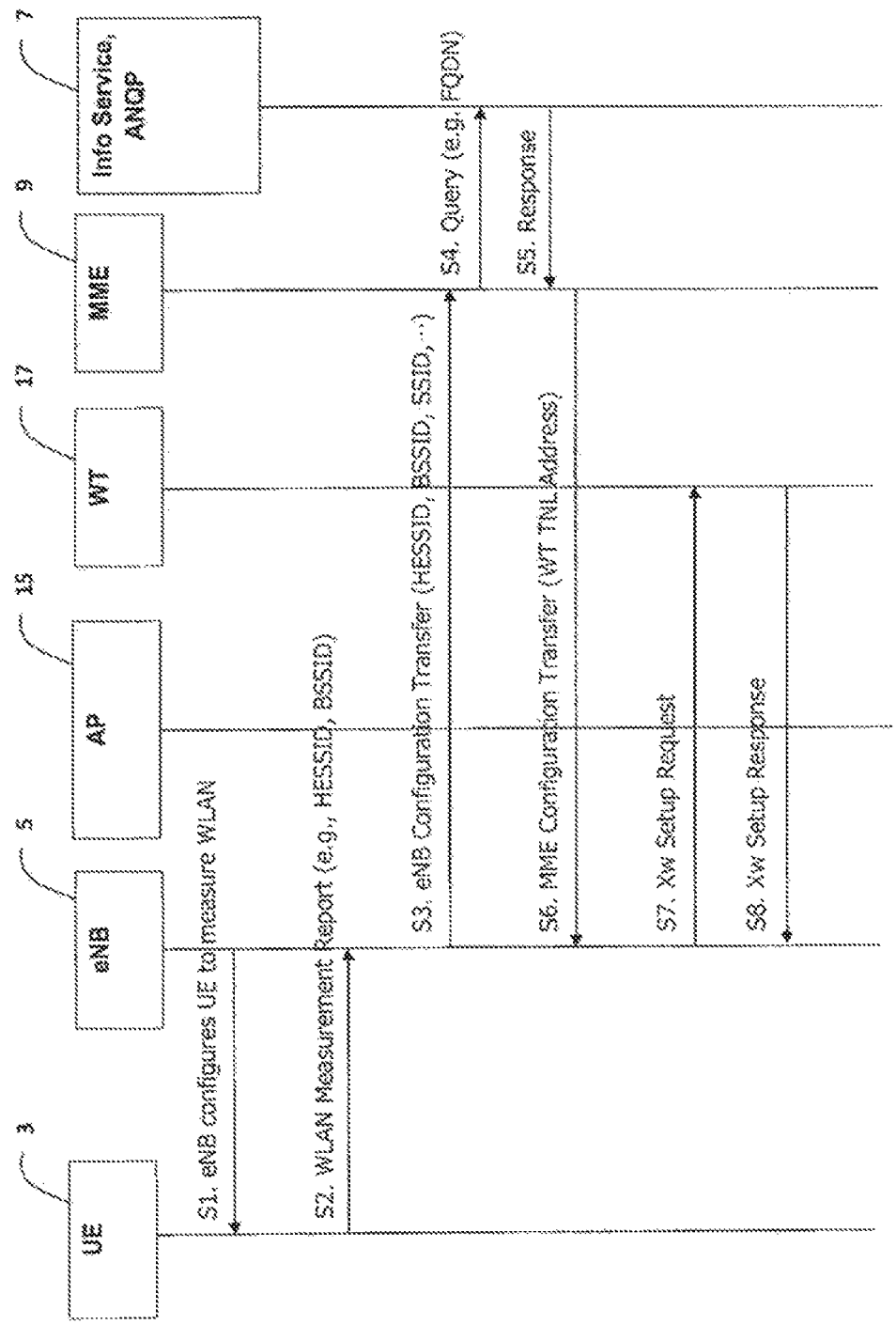
[Fig. 7]

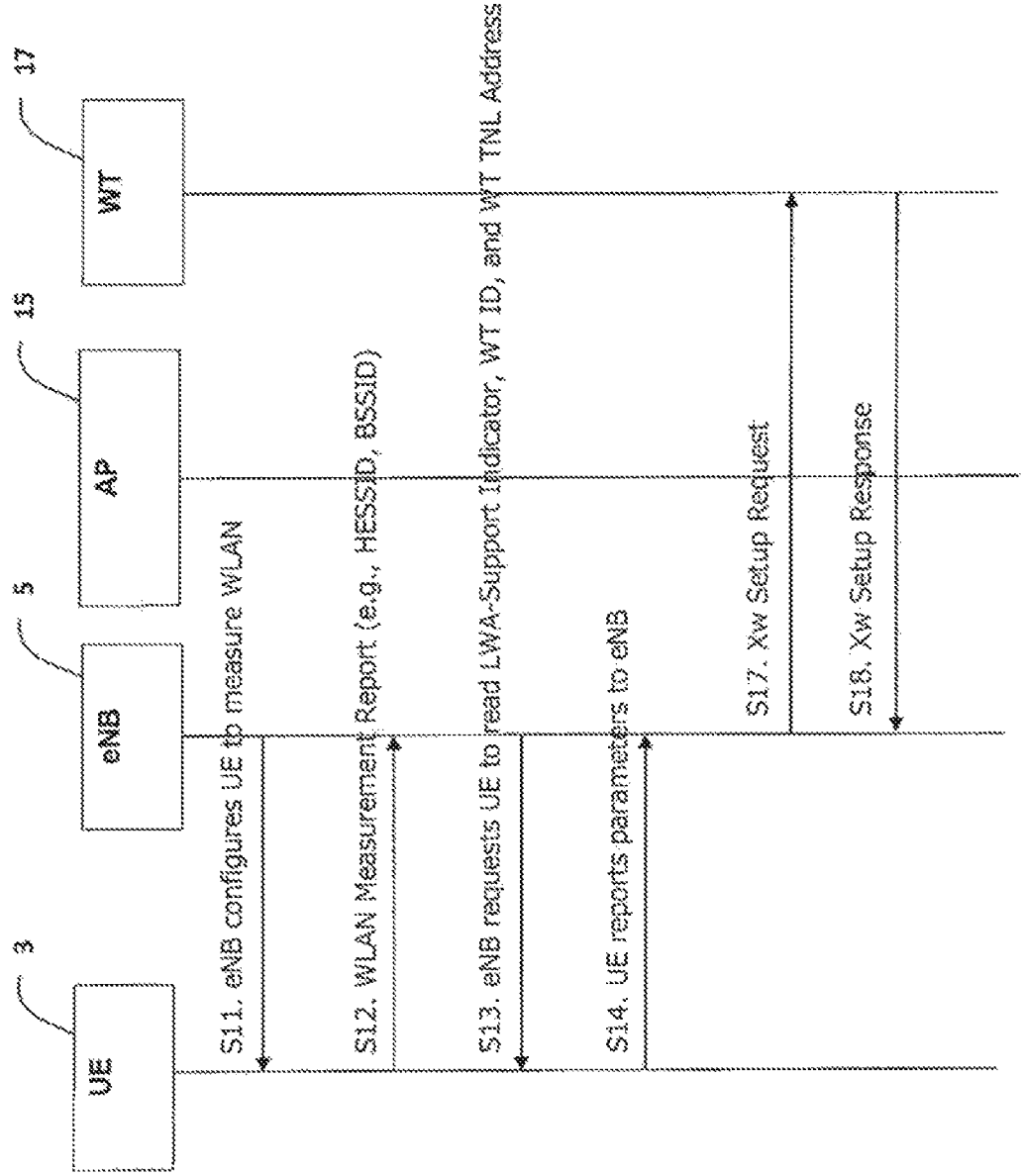
[Fig. 8]

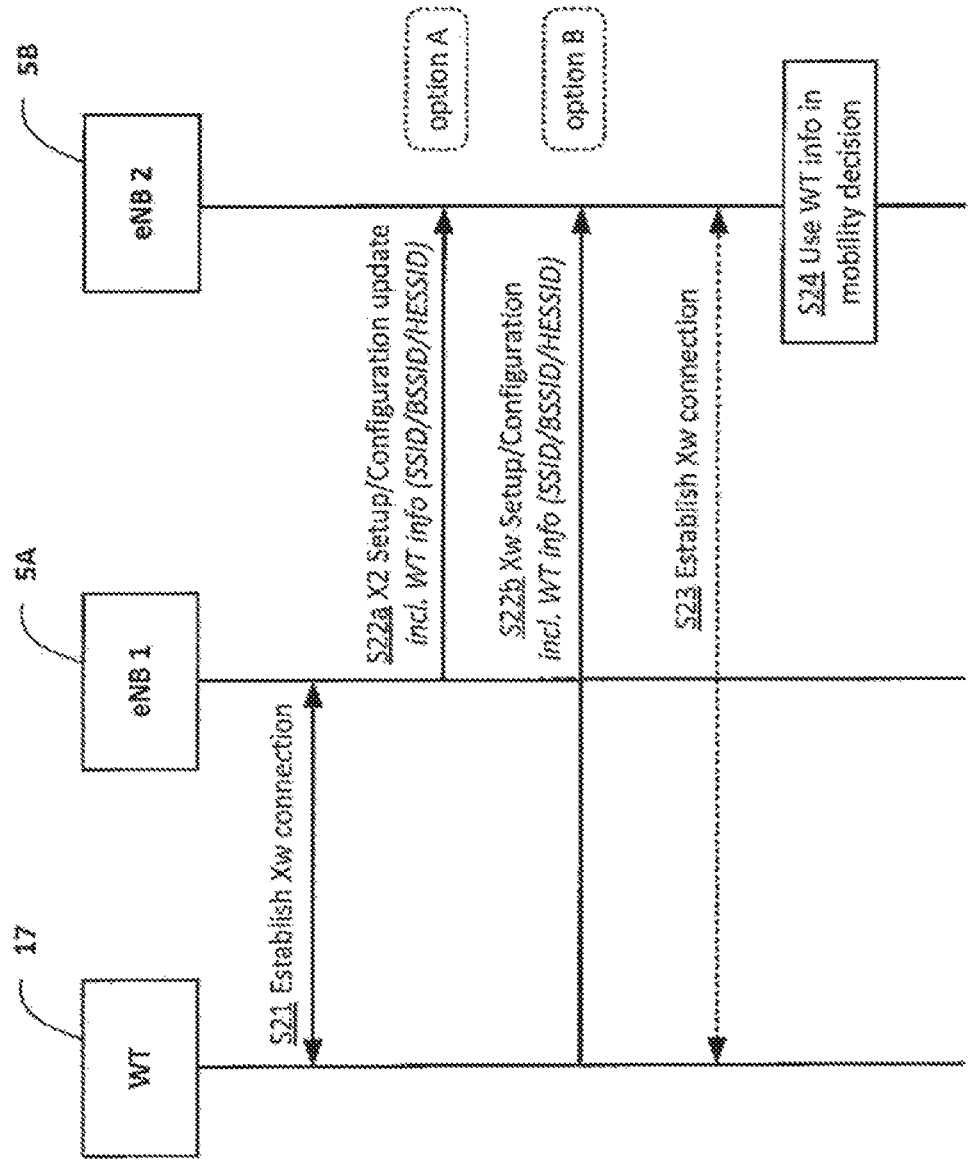
[Fig. 9]

SETUP OF BASE STATION CONNECTION TO WLAN

CROSS REFERENCE TO RELATED APPLICATIONS

This application is a National Stage of International Application No. PCT/JP2017/017713 filed May 10, 2017, claiming priority based on British Patent Application No. 1608492.3 filed May 13, 2016.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to automatic neighbour relation procedures.

BACKGROUND ART

The latest developments of the 3GPP standards are referred to as the Long Term Evolution (LTE) of Evolved Packet Core (EPC) network and Evolved Universal Mobile Telecommunications System (UMTS) Terrestrial Radio Access Network (E-UTRAN). Under the 3GPP standards, a NodeB (or an eNB in LTE) is the base station via which communication devices connect to a core network and communicate to other communication devices or remote servers. For simplicity, the present application will use the term base station to refer to any such base stations.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user. However, 3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems and the like. IoT devices can be implemented as a part of a (generally) stationary apparatus such as vending machines, roadside sensors, POS terminals, although some IoT devices can be embedded in non-stationary apparatus (e.g. vehicles) or attached to animals or persons to be monitored/tracked. It will be appreciated that IoT devices are sometimes also referred to as Machine-Type Communication (MTC) communication devices or Machine-to-Machine (M2M) communication devices. For simplicity, the present application refers to mobile devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

Most mobile devices support other communication technologies than LTE, for example, a communication technology in accordance with the 802.11 family of standards (commonly referred to as Wi-Fi). The 802.11 standards have been specified by the Institute of Electrical and Electronics Engineers (IEEE) for use in wireless local area networks (WLANs).

Unlicensed spectrum (such as WLANs and/or the like) is becoming increasingly important for cellular operators. In order to cater to operators' demand, 3GPP have defined a number of WLAN interworking features, including the so-called LTE-WLAN Aggregation (LWA) and the LTE WLAN Radio Level Integration with IPsec Tunnel (LWIP).

Effectively, LWA (or more recently, the 'enhanced LWA' or 'eLWA') facilitates the interworking and radio level integration between LTE networks and WLANs by configuring a single bearer to utilise LTE and WLAN resources simultaneously. LWA is described in 3GPP technical specification (TS) 36.300 V13.3.0, section 22A.1, the contents of which are incorporated herein by reference.

LWA supports two deployment scenarios:
  Collocated—integrated LTE base station (eNB) and WLAN access point (AP)/access controller (AC)
  Non-collocated—eNB and WLAN AP/AC connected via a WLAN Termination (WT) logical node using the interface Xw specified by 3GPP The Xw interface supports both control plane and data plane and terminates in the WT logical node.

LWA allows aggregating LTE and WLAN at radio access network (RAN) level and the WLAN AP/AC interacts with the LTE base station (over Xw). The E-UTRAN base station controls LWA for compatible user equipment (UE) in its cell, i.e. whether to use only LTE resources or both LTE and WLAN resources, based on measurement reporting provided by the UE.

The base station configures a WLAN mobility set for each mobile device for which LWA is activated, based on e.g. WLAN measurements by that mobile device. The WLAN mobility set is a group of WLAN APs (identified by their associated Service Set Identifier(s) and/or the like) and the WLAN mobility set is UE-specific. There is only one WLAN mobility set configured for a particular UE at a time, and all WLANs in the configured WLAN mobility set are connected to the same WT. Mobility within WLAN mobility set is controlled by the mobile device, i.e. transparent to the base station. However, mobility outside the WLAN mobility set is controlled by the base station.

SUMMARY OF INVENTION

Technical Problem

However, it is not currently possible to establish an Xw connection autonomously between a base station and a WLAN without significantly complicating base station functionality.

For example, a relatively complex, network-based solution has been considered by 3GPP, which requires each base station to connect to a domain name system (DNS) lookup server in order to obtain the address of the WT before being able to set up an appropriate Xw connection with that WT. This network-based solution is described in e.g. 3GPP Tdocs R3-160345, R3-160323, and R3-160545, the contents of which are incorporated herein by reference. Further details of the network-based solution described in R3-160323 are shown in FIGS. 5 and 6.

Moreover, it is not currently clear how to enable inter eNB mobility (i.e. between different LTE base stations) where the affected UE is served by a WLAN and there may, or may not be, a change in the serving WT as result of the UE's mobility.

Accordingly, preferred example embodiments of the present invention aim to provide methods and apparatus which address or at least partially deal with the above issues.

Although for efficiency of understanding for those of skill in the art, the invention will be described in detail in the context of a 3GPP system (UMTS, LTE), the principles of the invention can be applied to other systems in which communication devices or User Equipment (UE) access a core network using at least one radio access technology.

Solution to Problem

In one example aspect, the invention provides a base station for a communication network, the base station comprising: a transceiver configured to communicate with a communication device; and a controller configured to perform an automatic neighbour relation operation in relation to at least one Wireless Local Area Network, WLAN; wherein the controller is configured to obtain, from at least one of the communication device and a mobility management entity, an address associated with a node of the wireless local area network, WLAN, and to establish a connection with the node of the WLAN using the obtained address.

In another example aspect, the invention provides a base station for a communication network, the base station comprising: a transceiver configured to communicate with a neighbouring base station; and a controller configured to obtain, from at least one of the neighbouring base station and an access point of a wireless local area network, WLAN, information indicating that the neighbouring base station has a direct connection with a node of the WLAN.

In another example aspect, the invention provides a base station for a communication network, the base station comprising: a transceiver configured to communicate with a neighbouring base station; and a controller configured to obtain, from the neighbouring base station, information indicating that the neighbouring base station has a direct connection with a base station that is operable as a secondary base station, SeNB, in a dual connectivity, DC, arrangement.

In one example aspect, the invention provides a mobility management entity for a communication network, the mobility management entity comprising: a controller configured to obtain, upon request by a base station performing an automatic neighbour relation operation in relation to at least one wireless local area network, WLAN, an address associated with a node of the WLAN; and a transceiver configured to send, to the base station, the obtained address associated with the node of the WLAN.

In another example aspect, the invention provides a communication device for a communication network, the communication device comprising: a controller configured for obtaining, from an access point of a wireless local area network, WLAN, information identifying an address of a node of the WLAN; and a transceiver configured to provide the obtained information to the base station as part of an automatic neighbour relation operation in relation to the WLAN.

In a further example aspect, the invention provides an access point for a communication network, the access point comprising a transceiver configured to broadcast an address of a node of a wireless local area network (WLAN) to which the access point belongs.

Example aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Example embodiments of the invention will now be described, by way of example, with reference to the accompanying drawings in which:

BRIEF DESCRIPTION OF DRAWINGS

FIG. 1 illustrates schematically a cellular telecommunication system to which example embodiments of the invention may be applied;

FIG. 2 is a block diagram of a mobile device forming part of the system shown in FIG. 1;

FIG. 3 is a block diagram of a base station forming part of the system shown in FIG. 1;

FIG. 4 is a block diagram of a mobility management entity forming part of the system shown in FIG. 1;

FIG. 5 illustrates a currently proposed network-based solution;

FIG. 6 illustrates a currently proposed network-based solution;

FIG. 7 is a timing diagram illustrating an exemplary way in which example embodiments of the invention can be implemented in the system of FIG. 1;

FIG. 8 is a timing diagram illustrating an exemplary way in which example embodiments of the invention can be implemented in the system of FIG. 1; and FIG. 9 is a timing diagram illustrating an exemplary way in which example embodiments of the invention can be implemented in the system of FIG. 1.

DESCRIPTION OF EMBODIMENTS

Overview

FIG. 1 schematically illustrates a telecommunications network 1 in which mobile devices 3 (mobile telephones and/or other user equipment) can communicate with each other via a mobile network operator (MNO) network 2 using base stations 5 (e.g. LTE base stations or 'eNB') and a core network (not shown in FIG. 1) using an appropriate E-UTRA radio access technology (RAT). As those skilled in the art will appreciate, whilst three mobile devices 3 and one base station 5 are shown in FIG. 1 for illustration purposes, the system, when implemented, will typically include other base stations and communication devices.

Each base station 5 operates one or more associated cells. Mobile devices 3 connect to an appropriate cell (depending on their location and possibly on other factors, e.g. signal conditions, subscription data, capability, and/or the like) by establishing a radio resource control (RRC) connection with the base station 5 operating that cell.

The MNO network 2 also includes an Info/DNS service node 7 and a mobility management entity (MME) 9 (amongst other things). The Info/DNS service node 7 is responsible for storing respective transport network layer (TNL) addresses associated with each network node of the telecommunications network 1. The MME 9 is the network node responsible for keeping track of the locations of the mobile devices 3 within the communications network 1, and for assisting the serving base station 5 in configuring the communication bearers used by mobile devices in the base station's cell.

Each base station 5 is connected to the core network (MME 9) via an S1 interface and neighbouring base stations are connected to each other via an X2 interface. The core network (MNO network 2) typically also includes one or more serving gateways (S-GWs) and packet data network gateways (P-GWs) for providing a connection between the base stations 5 and other networks (such as the Internet) and/or servers hosted outside the core network.

As can be seen, some mobile devices 3 are also able to connect to a WLAN 12 (e.g. a WLAN 12A of 'Hotspot Operator 1' and/or a WLAN 12B of 'Hotspot Operator 2') via an appropriate access point 15 of that WLAN 12. The WLANs 12A and 12B (and hence the access points 15) are connected to the base station 5 via a respective WT node 17A/17B.

When the base station 5 enables LWA functionality for a compatible mobile device 3, the base station 5 configures the WLAN 12 via the corresponding WT node 17 to communicate user data via one or more access points 15 (simultaneously to communicating user data via the base station 5).

The telecommunications network 1 makes beneficial use of an Automatic Neighbour Relation (ANR) for LWA, for example, by utilising information acquired during discovery of WLANs under a particular base station's coverage (cell).

Specifically, in order to determine which WLAN 12 can be used by the mobile device 3, i.e. which WLANs 12 are overlapping with the cell of the base station 5, the nodes of the telecommunications network 1 are configured with appropriate ANR functionality to enable an appropriate Xw connection between the base station 5 and a WT node 17 associated with a neighbouring access point 15 to be setup autonomously without undue complexity (e.g. in an analogous way to establishing an X2 connection between neighbouring base stations).

In more detail, in this system the base station 5 is configured to obtain an appropriate WLAN identifier (e.g. a Service Set Identifier (SSID), a Homogenous Extended Service Set Identifier (HESSID), a Basic Service Set Identifier (BSSID), and/or the like) associated with each neighbouring WLAN 12. In order to do so, the base station 5 is able to configure the mobile device 3 to carry out, and report, appropriate WLAN measurements to allow detection of neighbouring access points 15 and to report the WLAN identifier of detected WLANs 12/access points 15 to the base station 5.

Based on the WLAN identifier, the base station 5 is configured to obtain (either from the MME 9 or from the mobile device 3) the TNL address of the WT node 17 that is associated with the WLAN identifier, i.e. the WT node that belongs to the same WLAN 12 as the access point(s) 15 detected by the mobile device 3. If the base station 5 obtains the TNL address of the WT node 17 from the MME 9, the MME 9 may be configured to perform an appropriate query with the Info Service (DNS/Fully Qualified Domain Name (FQDN)) node 7 in order to obtain the TNL address corresponding to the WLAN identifier reported by the mobile device 3. If the base station 5 obtains the TNL address of the WT node 17 from the mobile device 3, the base station 5 may configure the mobile device to obtain the TNL address of the WT node 17 from information broadcast by the detected access point 15 (and report the TNL address to the base station 5). The broadcasting of the WT address may be encrypted by the access point 15 such that only allowed UEs (in this example, the mobile device 3) and/or the base station 5 are able to decrypt the details.

Beneficially, using the obtained TNL address, the base station 5 is able to autonomously connect to the appropriate WT node 17 and configure LWA functionality for the mobile device 3 via the neighbouring WLAN 12 detected by the mobile device 3. There is no need for the base station 5 to implement functionality for querying the Info Service (e.g. DNS) node 7.

In a particularly beneficial example, neighbouring base stations 5 may be configured to notify each other about the WT node(s) 17 used by them. For example, neighbouring base stations 5 may be configured to exchange appropriate signalling messages including information identifying the WT node 17 being used and/or any associated WLAN ID. Beneficially, the exchanged information may help a source base station select an appropriate target base station for the mobile device in case of a handover.

Beneficially, therefore, a source base station is able to determine whether the handover requires a change of the WT node as well, even before triggering a handover, and the source base station knows what information it needs to exchange with the target base station, depending on handover type, in order to assist the operation of the target base station and avoid or minimise the risk of a radio link failure for the mobile device during handover.

Mobile Device

FIG. 2 is a block diagram illustrating the main components of the mobile device 3 shown in FIG. 1 (e.g. a mobile telephone or other user equipment). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a related mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within the memory 39. As shown, these software instructions include, among other things, an operating system 41, a communications control module 43, an LTE module 45, a WLAN module 47, and an ANR module 49.

The communications control module 43 is operable to control the communication between the mobile device 3 and its serving base station 5/access point 15 (and other communication devices connected to the serving base station 5/access point 15, such as further mobile devices and/or network nodes).

The LTE module 45 is responsible for communicating with base stations 5 operating in accordance with 3GPP standards (e.g. LTE). The WLAN module 47 is responsible for communicating with WLANs (one or more APs) operating in accordance with the 802.11 family of standards (e.g. Wi-Fi). When LWA is enabled for the mobile device 3, the mobile device 3 communicates simultaneously using the LTE module 45 and the WLAN module 47 in accordance with an associated LWA configuration provided by the base station 5.

The ANR module 49 is responsible for procedures relating to automatic neighbour relations, including obtaining at least one of an SSID, an HESSID, a BSSID, and a TNL address associated with a WT node 17 to be added as a neighbour for the base station 5 serving the mobile device 3.

Base Station

FIG. 3 is a block diagram illustrating the main components of a base station 5 shown in FIG. 1. As shown, the base station 5 has a transceiver circuit 51 for transmitting signals to and for receiving signals from the communication devices (such as mobile devices 3/user equipment) via one or more antenna 53, a core network interface 55 (e.g. an S1 interface) for transmitting signals to and for receiving signals from the core network (e.g. MME 9), and a base station interface 56 (e.g. an X2 interface) for transmitting signals to and for receiving signals from neighbouring base stations. The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within the memory 59. As shown, these software instructions include, among other things, an operating system 61, a communications control module 63, a measurement control module 65, a WLAN management module 67, an Xw module 68, and an ANR module 69.

The communications control module 63 is operable to control the communication between the base station 5 and mobile devices 3 (user equipment) and other network entities that are connected to the base station 5. The communications control module 63 also controls the separate flows of downlink user traffic (via associated data radio bearers) and control data to be transmitted to communication devices associated with this base station 5 including, for example, control data for managing LWA operation and/or mobility of the mobile device 3.

The measurement control module 65 is responsible for configuring measurements (including WLAN measurements relating to LWA) for mobile devices 3 connected to the base station 5 and for receiving and processing measurement results associated with such measurements. Based on the obtained measurement results, the measurement control module 65 assists other modules controlling LWA operation and/or mobility (e.g. handover) for the mobile devices 3.

The WLAN management module 67 is responsible for managing access to neighbouring WLANs for mobile devices 3 served by the base station 5, including controlling LWA functionality for compatible mobile devices 3. The WLAN management module 67 is also responsible for maintaining an appropriate WLAN mobility set for each LWA enabled mobile device 3.

The Xw module 68 is responsible for communicating with neighbouring WT nodes 17 using the Xw application protocol (Xw-AP). Although not shown in FIG. 3, the base station may also comprise an appropriate X2 module for communicating with neighbouring base stations using the X2 application protocol (X2-AP).

The ANR module 69 is responsible for procedures relating to automatic neighbour relations, including obtaining at least one of an SSID/HESSID/BSSID associated with an access point 15 and a TNL address associated with a WT node 17 to be added as a neighbour for the base station 5.

Mobility Management Entity

FIG. 4 is a block diagram illustrating the main components of the mobility management entity (MME) 9 shown in FIG. 1. As shown, the mobility management entity 9 has a transceiver circuit 71 for transmitting signals to and for receiving signals from the base stations 5 (and/or communication devices connected to the base stations 5) via a base station interface 75 (e.g. an S1 interface). The mobility management entity 9 has a controller 77 to control the operation of the mobility management entity 9. The controller 77 is associated with a memory 79. Although not necessarily shown in FIG. 4, the mobility management entity 9 will of course have all the usual functionality of a cellular telephone network mobility management entity and this may be provided by any one or any combination of hardware, software and firmware, as appropriate. Software may be pre-installed in the memory 79 and/or may be downloaded via the communications network 1 or from a removable data storage device (RMD), for example. The controller 77 is configured to control the overall operation of the mobility management entity 9 by, in this example, program instructions or software instructions stored within the memory 79. As shown, these software instructions include, among other things, an operating system 81, a communications control module 83, a configuration transfer module 85, and a query module 86.

The communications control module 83 is operable to control the communication between the mobility management entity 9 and the base stations 5 (including mobile devices 3 connected to the base stations 5) and other network entities that are connected to the mobility management entity 9.

The configuration transfer module 85 is responsible for handling (generating, sending, receiving) messages relating to the transfer of ANR configuration data between the MME 9 and a connected base station 5. For example, the configuration data may include at least one of an SSID/HESSID/BSSID associated with an access point 15 and a TNL address associated with a WT node 17.

The query module 86 is responsible for querying an information service/DNS node for ANR procedures relating to LWA. For example, the query module 86 may use Fully Qualified Domain Name (FQDN) procedures and/or Access Network Query Protocol (ANQP) procedures to obtain a TNL address associated with a WT node 17 to be added as a neighbour for a base station 5 connected to the MME 9.

In the above description, the mobile device 3, the base station 5, and the mobility management entity 9 are described for ease of understanding as having a number of discrete modules (such as the communications control modules and the ANR modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A more detailed description will now be given (with reference to FIGS. 5 to 8) of the scenario discussed above where a mobile device is configured for LWA by its serving base station, and where ANR and mobility procedures are provided autonomously.

Network-Based Approach

For completeness, FIGS. 5 and 6 illustrate a currently proposed network-based ANR approach in accordance with 3GPP Tdoc no. R3-160323.

As can be seen, the base station 5 (eNB) needs to connect to an 'Info Service' (e.g. a DNS lookup server and/or the like) in order to obtain the address of the WT node 17 before the base station 5 is able to set up an appropriate Xw connection with that WT node 17. The Info Service may be a DNS Lookup Server although this requires a domain name to be assigned together with an FQDN, ANQP, and/or Generic Advertisement Service (GAS) capability on the eNB side. Similar functionality is conventionally carried out by the MME 9 (e.g. for ANR relating to neighbouring base stations) and it may not be feasible and/or practical to implement this functionality in each eNB (e.g. because it may not be scalable).

Operation—First Example

FIG. 7 is a timing diagram (message sequence chart) illustrating an example process performed by components of the system 1 when performing an ANR procedure for setting up an Xw connection between a base station 5 (eNB) and a WT node 17.

Initially, as generally shown in step S1, the base station 5 (using its measurement control module 65) configures the mobile device 3 (UE) to measure the WLAN(s) 12 in the vicinity of the mobile device 3. The mobile device 3 carries out appropriate measurements (using its WLAN module 47), then using its LTE module 45 the mobile device 3 generates and sends, in step S2, an appropriately formatted WLAN measurement report to the base station 5. As can be seen, the WLAN measurement report includes an appropriate SSID/HESSID/BSSID associated with each measured access point 15 (obtained using the mobile device's ANR module 49). It will be appreciated that the WLAN measurement report may comprise an appropriately formatted 'SON Configuration Transfer' message and the respective SSID/HESSID/BSSID associated with each measured access point 15 may be included in a suitable information element (IE), for example, a 'Target AP-ID List' IE as shown in Table 1 below.

In this example, the mobile device 3 found an access point 15 of a WLAN 12 that is not yet configured for the base station 5 as a neighbour WLAN. The new access point 15/WLAN 12 is identified by its SSID/HESSID/BSSID included in the measurement report sent at step S2.

In order to set up the WT node 17 of the identified access point 15/WLAN 12 as a neighbour, the base station 5 generates (using its ANR module 69) and sends, in step S3, an appropriately formatted message to the MME 9 (e.g. an eNB configuration transfer message and/or other suitable S1 message) and includes in this message the SSID/HESSID/BSSID associated with the access point 15.

In response to this message, the MME 9 proceeds to obtain a TNL address associated with the WT node 17 that belongs to the same WLAN 12 as the access point 15 identified by the SSID/HESSID/BSSID in the eNB configuration transfer message. In this example, the MME 9 generates (using its query module 86) and sends, in step S4, an appropriately formatted message (e.g. an FQDN query) to the info service node 7 (e.g. a DNS lookup server/ANQP node) requesting the TNL address associated with the WT node 17. As generally shown in step S5, the info service node 7 returns an appropriate response to the MME's query, including the TNL address associated with the WT node 17 (of the WLAN 12 of the access point 15 identified by the SSID/HESSID/BSSID). The response from the info service node 7 may also include information identifying whether the detected access point 15/WT node 17 supports LWA, whether the WLAN 12 has any access restriction, an associated public land mobile network (PLMN)-ID, and/or the like.

Alternatively, the MME 9 might retrieve the TNL address from its local memory 79 (e.g. if the TNL address is already available at the MME 9). Therefore, steps S4 and S5 are optional (or they may be performed prior to step S3).

Once the MME 9 has retrieved the TNL address of the WT node 17 (from the info service node 7 or local memory 79), the MME 9 generates (using its configuration transfer module 85 and sends, in step S6, an appropriately formatted message to the base station 5 (e.g. an MME configuration transfer message and/or other suitable S1 message) and includes in this message the TNL address associated with the WT node 17. The MME 9 may also include in this message information identifying the WT node 17 (e.g. a WT ID) and/or information identifying each BSSID, HESSID, and/or SSID supported by the WT node 17. If the MME 9 determines that the detected access point 15/WT node 17 does not support LWA and/or this particular WLAN 12 is not accessible for users of the MNO network 2, then the MME 9 may be configured to send, to the base station 5, an appropriate indication to this effect (e.g. LWA not supported, WLAN access restricted, TNL address not available, and/or the like).

It will be appreciated that the message sent at step S3 and/or step S6 may comprise an appropriately formatted 'X2 TNL Configuration Info' message, and the respective SSID/HESSID/BSSID associated with each access point 15 and the TNL address of the WT node 17 may be included in suitable IEs of the 'X2 TNL Configuration Info' message. For example, the TNL address of the WT node 17 may be included in a 'WT Transport Layer Address' IE and the SSID/HESSID/BSSID associated with a particular access point 15 may be included in a 'Supported BSSID, HESSID-, SSID-List' IE as shown in Table 2. It will be appreciated that the SSID/HESSID/BSSID associated with each access point 15 is preferably sent as a list mainly because the mobile device 3 may have identified more than one BSSID that belong to more than one WT node 17.

Using the TNL address received in step S6, the base station 5 generates (using its Xw module 68) and sends, in step S7, an appropriately formatted Xw signalling message (e.g. an Xw setup request) to the WT node 17 in order to initiate setting up of an Xw connection with the WT node 17. In step S8, the WT node 17 generates and sends an appropriate response (e.g. an Xw setup response and/or the like), in which it confirms that the Xw connection has been set up with the base station 5 (or the WT node 17 returns an appropriate failure notification to the base station 5 if the Xw connection cannot be set up).

When the Xw connection is successfully set up between the base station 5 and the WT node 17, the ANR configuration procedure is complete, and the base station 5 may use the access points 15 connected to this WT node 17 for (e)LWA for compatible mobile devices. For example, the access point(s) 15 identified by the SSID/HESSID/BSSID (reported in step S2) can now be included in the WLAN mobility set for the mobile device 3.

Beneficially, in this example, there is no need to enable every base station to connect to a special info/DNS server for ANR operation. Therefore, there is no need for the base station to be configured with FQDN, ANQP, and/or GAS functionalities (which in turn may result in a simplified base station design).

TABLE 1

SON Configuration Transfer (when applied to e.g. section 9.2.3.26 of 3GPP TS 36.413)

| IE/Group Name | Presence | Range | IE type and reference | Semantics description | Criticality | Assigned Criticality |
|---|---|---|---|---|---|---|
| SON Configuration Transfer | | | | | | |
| >Target AP-ID List | | 0 . . . <maxnoofWLAN AP> | | | | |
| >> SSID | O | | 9.2.1.x1 | | | |
| >> HESSID | O | | 9.2.1.x2 | | | |
| >> BSSID | O | | 9.2.1.x3 | | | |
| >Target eNB-ID | O | | | | | |
| >>Global eNB ID | M | | 9.2.1.37 | | | |
| >>Selected TAI | M | | TAI 9.2.3.16 | | | |
| >Source eNB-ID | M | | | | | |
| >>Global eNB ID | M | | 9.2.1.37 | | | |
| >>Selected TAI | M | | TAI 9.2.3.16 | | | |
| >SON Information | M | | 9.2.3.27 | | | |
| >X2 TNL Configuration Info | C-ifSONInformationRequest | | 9.2.3.29 | Source eNB X2 TNL Configuration Info. | YES | ignore |
| >Synchronisation Information | C-if Activate Muting | | 9.2.3.42 | Information on cell selected as source of synchronisation and aggressor cells. | YES | ignore |

| Range bound | Explanation |
|---|---|
| maxnoofWLAN AP | Maximum no. of WLAN AP per node per RAT. |

TABLE 2

X2 TNL Configuration Info (when applied to e.g. section 9.2.3.29 of TS 36.413)

| IE/Group Name | Presence | Range | IE type and reference | Semantics description | Criticality | Assigned Criticality |
|---|---|---|---|---|---|---|
| eNB X2 Transport Layer Addresses | | 1 . . . <maxnoofeNBX2TLAs> | | | | |
| >Transport Layer Address | M | | 9.2.2.1 | Transport Layer Addresses for X2 SCTP end-point. | | |
| eNB X2 Extended Transport Layer Addresses | | 0 . . . <maxnoofeNBX2ExtTLAs> | | | YES | Ignore |
| >IP-Sec Transport Layer Address | O | | 9.2.2.1 | Transport Layer Addresses for IP-Sec end-point. | — | — |
| >eNB GTP Transport Layer Addresses | | 0 . . . <maxnoofeNBX2GTPTLAs> | | | — | — |
| >>GTP Transport Layer Address | M | | 9.2.2.1 | GTP Transport Layer Addresses for GTP end-points (used for data forwarding over X2). | — | — |
| eNB Indirect X2 Transport Layer Addresses | | 0 . . . <maxnoofeNBX2TLAs> | | | YES | Ignore |
| >Transport Layer Address | O | | 9.2.2.1 | Transport Layer Addresses for Indirect X2 SCTP end-point. | | |
| WT Xw Transport Layer Addresses List | | 0 . . . <maxnoofWLANAP> | | | YES | ignore |
| >WT ID | M | | 9.2.2.y | Unique WT ID | | |
| >WT Transport Layer Address | M | | 9.2.2.1 | Transport Layer Addresses for X2 SCTP end-point. | | |
| >Supported BSSID, HESSID-SSID-List | | | | | | |
| >> HESSID | | | 9.2.1.x1 | | | |
| >> BSSID | | | 9.2.1.x2 | | | |
| >> SSID | | | 9.2.1.x3 | | | |

In summary, the above example provides at least some of the following benefits:

Ensures network (MME) control, thus the base station cannot arbitrarily connect to any WT node. This operation is preferred by MNOs.

Scalable: there is no need to connect every base station to an external DNS server and ANR operation is kept simple on the base station's side.

It is estimated that there may be several million base stations deployed by various MNOs, each of which base stations need to be configured and upgraded regularly. Scalability is therefore important for MNOs.

There is no need to make each base station FQDN capable. Neither the base station (eNB) nor the mobile device (UE) are required to support GAS and/or ANQP functionality.

In this example, only the MME is required to support FQDN/ANQP/GAS (which may be already supported by the MME for other purposes). The provision of a (single) secure connection between the MME and the Info service is less expensive compared to the provisioning of (multiple) secure connections between each base station and Info Servers.

Security: there is no need to expose the TNL address of a centralized Info Service to every network node (including potentially malicious or incorrectly configured (H)eNBs/WT nodes) thereby user plane traffic is not compromised. There is also no issue with using a network address translator (NAT).

Operation—Second Example

FIG. 8 is a timing diagram (message sequence chart) illustrating another example process performed by components of the system 1 when performing an ANR procedure for setting up an Xw connection between a base station 5 (eNB) and a WT node 17. In this example, the base station 5 is configured to obtain the TNL address of the WT node 17 from the mobile device 3.

It will be appreciated that each WLAN AP 15 that supports LWA broadcasts one or more of the following information (e.g. in addition to the SSID/HESSID/BSSID associated with that access point):

information (e.g. a PLMN-ID) identifying a public land mobile network (PLMN) associated with the WLAN 12/access point 15;

information identifying that the WLAN 12/access point 15 supports LWA functionality (e.g. an appropriate 'LWA-Support Indicator' IE/flag);

information (e.g. a WT ID) identifying the WT node 17 associated with the access point 15; and the TNL Address of the WT node 17 associated with the access point 15.

For example, the access points may use an appropriately formatted transparent container (e.g. as defined in Annex H of 3GPP TS 24.302 V13.5.0) for broadcasting the above information.

The procedure begins in step S11 which corresponds to step S1 described above with reference to FIG. 7. In step S11, the serving base station 5 configures the mobile device 3 to measure the WLAN(s) 12 in the vicinity of the mobile device 3. After appropriate measurements the mobile device 3 generates and sends, in step S12, a WLAN measurement report to the base station 5. In this example, the WLAN measurement report includes the WLAN AP ID (e.g. SSID/HESSID/BSSID) associated with the detected access point 15.

If the WLAN AP ID is not recognised by the base station 5 as a neighbour (e.g. not stored in its WLAN management module 67/ANR module 69), then the base station 5 proceeds to generate (using its measurement control module 65) and send, in step S13, an appropriately formatted signalling message to the mobile device 3 requesting the mobile device 3 to read the LWA information broadcast by the access point 15 (e.g. the LWA-Support Indicator, WT ID, and/or TNL address of the WT node 17). It will be appreciated that the access point 15 may use an LWA-specific encryption when broadcasting the information, thus the mobile device 3 may need to decrypt the information if appropriate.

The mobile device 3 (using its ANR module 49) reads the requested parameters (the information broadcast by the access point 15 such as the LWA-Support Indicator, WT ID, and/or TNL address of the WT node 17), then in step 14, the mobile device 3 generates (using its LTE module 45) and sends an appropriate signalling message and reports the requested parameters to the base station 5. It will be appreciated that the mobile device 3 may not need to decrypt the LWA information broadcast by the access point 15. Instead, the mobile device 3 may be configured to send the captured information to the base station 5 (for decrypting and processing by the base station 5).

In steps S17 and S18 (which correspond to steps S7 and S8, respectively), the base station 5 establishes an Xw connection towards the detected WT node 17, using the parameters (TNL address, etc.) provided by the mobile device 3.

Beneficially, this 'UE-based' example does not require connecting to an Info/DNS service node or ANQP server for looking up the TNL address of the WT node 17.

Operation—Mobility

As explained in the introduction, it is not currently clear how to enable inter eNB mobility (i.e. between different LTE base stations) where the affected UE is served by a WLAN and there may, or may not be, a change in the serving WT as result of the UE's mobility. The inventors have realised that before triggering a handover, the source base station is unable to determine whether the handover requires a WT change or not. This is because different types of information need to be exchanged between the source and target base station depending on handover type (i.e. with or without WT change).

As mentioned above, in case of a handover between base stations 5, the handover may involve changing the WT node 17 that is involved with the LWA service configured for the mobile device 3 being handed over.

Beneficially, in this example, the source base station 5 is able to determine whether the handover requires a change of the WT node 17, before triggering a handover.

This is possible because in this system neighbouring base stations 5 are configured to notify each other about each WT node 17/WLAN 12 they use. For example, the base stations 5 may be configured to exchange appropriate signalling messages (e.g. X2 Setup and/or Configuration Update messages shown in Table 3) including information identifying any WT node 17 being used and/or any associated WLAN ID (e.g. a 'WT List' IE and/or the like). Alternatively, the WT nodes 17 may be configured to notify their neighbouring base stations 5 when they establish an Xw connection with a new base station.

In more detail, as generally illustrated in step S21 of FIG. 9, the WT node 17 and a base station 5A may establish an Xw connection (for example, as described above with reference to FIG. 7 or 8).

Following the establishment of the Xw connection, there are two options. In 'option A', which is illustrated in step S22a, the base station 5A generates and sends an appropriate signalling message (e.g. an 'X2 Setup' message or an 'X2 Configuration Update' message) to its neighbour base station 5B. In 'option B', which is illustrated in step S22b, the WT node 17 generates and sends an appropriate signalling message (e.g. an 'Xw Setup' request/response message, an 'Xw Configuration Update' message, or a 'WT Configuration Update' message) to the base station 5B (assuming that the WT node 17 and the base station 5B are connected). The signalling message includes, in a suitable information element, information identifying the WT node 17 and/or the identifier(s) (e.g. one or more SSID/BSSID/HESSID) associated with the WLAN 12 that the WT node 17 forms part of.

node 17 and hence the source base station 5B knows which target base station to choose in order to minimise the risk of a radio link failure (RLF) and to ensure a sufficient Quality of Experience (QoE) for the mobile device 3 in case of a handover. For example, if the source base station 5B is configured to make a handover decision based purely on radio conditions, it may choose a target base station that does not have the same WT connectivity. In this case, it may be better to choose a target base station that has the same WT connectivity (assuming that the target's radio conditions are comparable).

The base station 5B also knows the type of information it needs to exchange with the target base station (e.g. base station 5A) depending on handover type (i.e. with or without WT change).

TABLE 3

X2 Setup and Configuration update

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 . . . <maxCellineNB> | | Complete list of cells served by the eNB | YES | reject |
| >Served Cell Information | M | | 9.2.8 | | — | — |
| >Neighbour Information | | 0 . . . <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0 . . . 503, . . .) | Physical Cell Identifier of the neighbour cell | — | — |
| >>EARFCN | M | | 9.2.26 | DL EARFCN for FDD or EARFCN for TDD | — | — |
| >>TAC | O | | OCTET STRING (2) | Tracking Area Code | YES | ignore |
| >>EARFCN Extension | O | | 9.2.65 | DL EARFCN for FDD or EARFCN for TDD. If this IE is present, the value signalled in the EARFCN IE is ignored. | YES | reject |
| WT List | | 0 . . . <maxWT> | | | | |
| > WT ID | M | | 9.2.6 of TS 36.463 | | | |
| > Detected WLAN AP List | | 0 . . . 1 | | | | |
| >> SSID | O | | | | | |
| >> BSSID | M | | | | | |
| >> HESSID | O | | | | | |
| GU Group Id List | | | | List of all the pools to which the eNB belongs | GLOBAL | reject |
| > GU Group Id | M | | 9.2.20 | | — | — |
| LHN ID | O | | 9.2.83 | | YES | ignore |

As generally shown in step S23, if the neighbour base station 5B is not yet connected to the WT node 17, they may proceed to establish an Xw connection based on the information provided by the base station 5A (e.g. after obtaining the TNL address of the WT node 17 from the MME 9, as described above with reference to steps S3 to S6 of FIG. 7).

Therefore, when the base station 5B serving the mobile device 3 (whilst LWA is active) is beneficially able to use the obtained information about the neighbouring base station's WT connectivity in its mobility decision (step S24).

Beneficially, therefore, the base station 5B (when acting as a source eNB) knows in advance whether or not the handover (e.g. to base station 5A) involves a change of WT Modifications and Alternatives Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above example embodiments, the base station uses a 3GPP radio communications (radio access) technology to communicate with the mobile device. However, any other radio communications technology (i.e. WLAN, Wi-Fi, WiMAX, Bluetooth, etc.) can be used for managing transmissions of mobile devices in accordance with the above embodiments. The above example embodiments are also applicable to 'non-mobile' or generally stationary user equipment.

In the above example embodiments, access points (APs) are used as exemplary WLAN nodes. However, it will also be appreciated that access controllers (ACs) may also be used in the WLANs and in this case the mobile device may be configured to detect and report access controllers to the serving base station.

In the above example embodiments, the LWA capable mobile device is described to carry out WLAN measurements. 3GPP TS 36.300 specifies that each UE (mobile device) supporting LWA may be configured by the E-UTRAN (base station) to perform WLAN measurements. A WLAN measurement object can be configured using WLAN identifiers (BSSID, HESSID, and SSID), WLAN channel number, and WLAN band. WLAN measurement reporting is triggered using received signal strength indicator (RSSI). WLAN measurement report may contain RSSI, channel utilization, station count, admission capacity, backhaul rate, and WLAN identifier.

Thus, it will be appreciated that the measurement configuration (e.g. steps S1 and S11) from the base station may include: WLAN ids, WLAN band, and/or frequency/channel to be measured. It will also be appreciated that the WLAN measurement report (e.g. steps S2 and S12) from the mobile device may include: WLAN ids, RSSI, STA count, backhaul rate, admission capacity, channel utilization, and/or other metrics.

3GPP have defined the following WLAN measurement events:

Event W1: WLAN becomes better than a threshold;

Event W2: All WLAN inside WLAN mobility set become worse than a threshold1 and a WLAN outside WLAN mobility set becomes better than a threshold2;

Event W3: All WLAN inside WLAN mobility set become worse than a threshold.

In the above description of FIG. 7, the base station is described to send an eNB configuration transfer message and/or other suitable S1 message and includes in this message (e.g. in an appropriate information element thereof) the SSID/HESSID/BSSID associated with the detected access point. However, it will also be appreciated that other messages may also be used, for example, a WT address discovery message and/or the like.

In the above description of FIG. 9, the base stations are described to exchange information about their WT node connectivity. It will be appreciated that the exchanged information may include information identifying whether a particular base station has a direct Xw connection with a WT node (LWA case) and/or whether a particular base station has a direct X2 connection with another base station (e.g. a base station configurable as a secondary base station in a dual connectivity scenario). Table 4 illustrates an exemplary information element of the X2 Setup/Configuration update message that may be used for this purpose. It will be appreciated that the information exchanged between the base stations may be used in selection of an appropriate target base station (e.g. both in LWA and dual connectivity scenario).

TABLE 4

| X2 Setup/Configuration update information elements | |
|---|---|
| >Neighbour Information | |
| >>ECGI | M |
| >>PCI | M |
| >>EARFCN | M |
| >>TAC | O |
| >>EARFCN Extension | O |
| >>has X2 | Yes/No |

In the above description, the mobile device, the base station, and the MME are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the mobility management entity, or to the mobile device as a signal over a computer network, or on a recording medium. Further, the functionality performed by part or all of this software may be performed using one or more dedicated hardware circuits. However, the use of software modules is preferred as it facilitates the updating of the base station, the mobility management entity, or the mobile device in order to update their functionalities.

The controller of the base station may be configured to control, using the established connection, aggregation of resources for concurrent communications via a cell operated by the base station and via an access point of the WLAN.

The controller of the base station may be configured to obtain, from the mobility management entity, the address associated with a node of a WLAN by sending, to the mobility management entity, a signalling message for triggering transfer of the address associated with the node of the WLAN (e.g. an 'eNB Configuration Transfer' message or a 'WT Address Discovery' message).

The controller of the base station may be configured to obtain, from the communication device, the address associated with a node of a WLAN by sending, to the communication device, a message to request that the communication device reads the address of the node of the WLAN (reading WLAN information broadcast).

The signalling message may include an identifier for identifying the WLAN, for example, a Service Set Identifier (SSID); a Homogenous Extended Service Set Identifier (HESSID); and/or a Basic Service Set Identifier (BSSID).

The address may comprise a transport network layer (TNL) address.

The controller of the base station may be further configured to obtain at least one of: information (e.g. a 'WT ID') identifying a node of the WLAN, a list of access points of the WLAN; and an identifier for identifying the WLAN (for example, a Service Set Identifier (SSID); a Homogenous Extended Service Set Identifier (HESSID); and/or a Basic Service Set Identifier (BSSID)).

The request by the base station to the mobility management entity may comprise a signalling message for triggering transfer of the address associated with the node of the WLAN (e.g. an 'eNB Configuration Transfer' message or a 'WT Address Discovery' message).

The controller of the mobility management entity may be configured to obtain the address associated with the node of the WLAN from an information service or domain name system node (e.g. using an appropriate Fully Qualified Domain Name (FQDN) procedure and/or an Access Network Query Protocol (ANQP) procedure).

The controller of the communication device may be further configured for aggregation of resources for concurrent communications via a cell operated by the base station and via an access point of the WLAN.

The transceiver of the communication device may be configured to receive, from the WLAN, an identifier for identifying the WLAN; and to provide the received identifier to the base station in a measurement report.

The transceiver of the communication device may be configured to receive, from the base station after sending the measurement report, a message to request that the communication device reads the address of a node of the WLAN identified by the identifier; and wherein the controller is configured to perform said obtaining of the address of the node of the WLAN in response to the request message.

The message may be further configured to request that the communication device reads at least one of: information (e.g. a PLMN-ID) identifying a public land mobile network (PLMN) associated with the WLAN; information identifying that the access point supports LTE-WLAN Aggregation (LWA) functionality (e.g. an 'LWA-Support Indicator'); and information (e.g. a 'WT ID') identifying the node of the WLAN.

The communication device may be configured to obtain at least one of: the information identifying a PLMN associated with the WLAN; the information identifying that the access point supports LWA functionality; and the information identifying the node of the WLAN.

The transceiver of the access point may be further configured to broadcast at least one of: information (e.g. a PLMN-ID) identifying a public land mobile network, PLMN, associated with the WLAN; information identifying that the access point supports LTE-WLAN Aggregation, LWA, functionality (e.g. an 'LWA-Support Indicator'); and information (e.g. a 'WT ID') identifying the node of the WLAN.

Various other modifications will be apparent to those skilled in the art and will not be described in further detail here.

The following is a detailed description of the ways in which the above described automatic neighbour relation embodiments may be implemented in the currently proposed 3GPP standards. Whilst various features are described as being essential or necessary, this may only be the case for the proposed 3GPP standard, for example due to other requirements imposed by the standard. These statements should not, therefore, be construed as limiting the present invention in any way.

1 Introduction

As the name implies, the intention of ANR is to minimise configuration effort of an operator especially for establishing relationship between neighbours. Given the billions of WiFi Access Points out there having relatively smaller coverage when compared to their LTE counterparts, ANR will play an important role in relieving operator from substantial configuration that is otherwise required. ANR will help an eNB identify its WiFi neighbour nodes through the neighbour relation table (NRT) creation, for providing better service to end customers. ANR consists of WT TNL address lookup and subsequent establishment of Xw interface. Security and Scalability will be the utmost decision-making factors when working on solutions given the sheer size and non-operator deployed nature of access points that roughly work on the same ISM band.

This paper discusses in terms of how to make ANR reliable and robust by considering a number of design factors.

2 Discussion

In Rel-13 LWA work, it may have been implied that neighbour relations are formed mainly using OAM (Operation, Administration, and Maintenance) as opposed to through RRC measurement reporting. Unlike in LTE case, there is a need for a UE and eNB to steer clear of those that do not belong to an Operator and that do not support LWA. If this information is not there, the ANR will result in a tiring exercise for a UE as well as to an eNB. Hence, it is important to decide on what needs to be broadcast by an AP that supports LWA. The following is thus at least required to be broadcast by an AP:

i) PLMN-ID ii) LWA Support Indicator

It is hence important to decide whether LWA AP needs to have a Special behaviour in terms of what information it includes in its beacons.

Observation 1:

Including new Information in LWA AP beacons can minimise effort required by UE and eNB as part of ANR exercise.

Proposal 1:

RAN2/RAN3 is respectfully requested to explore whether augmenting LWA AP beacons is possible through collaborating with IEEE 802.11 Standardisation bodies.

With extra pieces of Information being included in AP beacons, a UE can now report only those relevant AP Identities (e.g., BSSID, HESSID, SSID) to an eNB for ANR purposes. Unlike in LTE, it is required for an eNB in LWA to first identify the mapping OR relationship between a detected AP ID and a WT ID and fetch corresponding TNL address of WT before it can establish Xw with a relevant WT. In order to deal with this, presented different network-based and UE-based solutions were presented after acknowledging the huge OAM effort being required on an operator unless this process is automated.

A network-based solution is presented in R3-160323 that requires each eNB to connect to an Info Service to figure out AP-WT relationship and subsequently to get TNL Address of the relevant WT. For this purpose, each eNB need to be capable of supporting FQDN functionality to trigger DNS-like query. Further connecting each eNB (more than 1 million in countries like China) to such an Info Service will not be scalable. In addition ensuring secure connection between each eNB and an Info Service after authentication can be expensive.

Observation 2:

Connecting each eNB (more than 1 million in big countries) to an Info Service can lead to huge OPEX/CAPEX to an operator.

In the light of this burden to any operator that wants to support LWA, this paper presents a UE-based as well as a network-based Solutions to deal with Scalability and security issues.

2.1 Network-Based Solution:

Although radio agnostic, an MME gets involved in disseminating TNL addresses of a target eNB in the LTE ANR process. This means that the initial LTE design is not really in favour of allowing an eNB to connect to a DNS-server functionality for the purpose of fetching a TNL address belonging to a detected neighbour. Although this can increase core network signalling, this mechanism ensures that E-UTRAN nodes contact a core node for retrieving information regarding another E-UTRAN node for scalability and security reasons. This need is paramount in the case of LWA because WiFi hotspots are not always mobile network operator (MNO) deployed—but may belong to a different Hotspot Operator (HSO).

Observation 3:

Involving an MME in WT address discovery will make any Signalling-based Solution Scalable and Secure.

Accordingly, an MME gets involved in each TNL Address discovery and as a result there is no need to maintain connection between each eNB and an Info Service. This can relieve an MNO as upgrading an MME can be considered as a natural evolution and relatively easy and scalable when compared to connecting each eNB to an Info Service and upgrading each eNB with new functionalities. As shown in FIG. 7, eNB/MME Configuration Transfer messages can be augmented or completely new messages can be used for this purpose that can enable an eNB to inquire more than one BSSID, HESSID OR SSID and in return an MME supplies TNL addresses belonging to more than one WT. Further, each WT is an MNO controlled entity and hence, authenticating using MME is readily possible. Hence, MME involvement will ensure that an eNB does not connect to any arbitrary WT that is unknown to the network.

Proposal 2:

RAN3 is respectfully requested to explore whether MME involvement in WT TNL Address discovery is paramount to ensure security and scalability.

2.2 UE-Based Solution:

In order to minimize LWA impact on LTE network, a UE-based solution that enables an eNB to get WT TNL Address can be helpful. A different UE-based solution that requires each UE to inquire an ANQP Server for the purpose of getting WT address has been previously presented. It requires big effort and capabilities such as GAS for a UE to query an AP which has not been associated with.

Observation 4:

Querying an AP before getting associated by a UE cannot be really preferred.

As a natural evolution of the current ANR, each UE can be requested to incrementally gather details of an AP by an eNB. As part of this, an LWA AP may be configured to broadcast its WT relationship and WT TNL Address in a secure way with proper encryption in place. With a UE supplied WT TNL Address, an eNB can readily establish Xw with no need of connecting LTE network to any Info Service.

Pros:
  No major network impact hence, OPEX/CAPEX (capital expenditure/operational expenditure) is less
  Less OAM configuration
Cons:
  New UE behaviour.
  need to have secure mechanism in place for broadcasting WT details Observation 5:

A UE-based Solution is Simpler only if it can be made Secure.

Proposal 3:

RAN3 is respectfully requested to analyse the pros and cons of the UE-based and the network-based in terms of cost, scalability and security and choose the right Solution.

3 Conclusion and Proposals

This paper Analyses the need for fully scalable and secure WT TNL Address discovery and analyses two solutions in this regard. With its basic Analysis, it further makes the following Observations and proposals:

Observation 1:

Including new Information in LWA AP beacons can minimise effort required by UE and eNB as part of ANR exercise.

Proposal 1:

RAN2/RAN3 is respectfully requested to explore whether augmenting LWA AP beacons is possible through collaborating with IEEE 802.11 Standardisation bodies.

Observation 2:

Connecting each eNB (more than 1 million in big countries) to an Info Service can lead to huge OPEX/CAPEX to an operator.

Observation 3:

Involving an MME in WT address discovery will make any Signalling-based Solution Scalable and Secure.

Proposal 2:

RAN3 is respectfully requested to explore whether MME involvement in WT TNL Address discovery is paramount to ensure security and scalability.

Observation 4:

Querying an AP before getting associated by a UE cannot be really preferred.

Observation 5:

A UE-based Solution is Simpler only if it can be made Secure.

Proposal 3:

RAN3 is respectfully requested to analyse the pros and cons of the UE-based and the network-based in terms of cost, scalability and security and choose the right Solution.

The following is a detailed description of the way in which the above described UE mobility related embodiments may be implemented in the currently proposed 3GPP standards. Whilst various features are described as being essential or necessary, this may only be the case for the proposed 3GPP standard, for example due to other requirements imposed by the standard. These statements should not, therefore, be construed as limiting the present invention in any way.

1 Introduction

Seamless mobility while having LWA is within the scope of this new WI on LWA. In RAN3 #91bis, several mobility cases had been analysed and subsequently the following WA was made:

WA: HO without WT change

Other Scenarios including one that involves WT change can still be within the Scope of future discussion based on consensus. This means that other mobility scenarios have not been ruled out yet. Any of these mobility cases however require a Source eNB to first figure out whether a particular UE HO involves WT change OR not. At the moment no prior discussion has ever considered this.

The objective of this paper is to explore whether any priory information has to be in place at the source eNB side for it to execute the correct HO.

2 Discussion

Offloading to WLAN through LWA enables better user experience while enabling a network operator to manage its scarce and expensive radio resources efficiently. At the time of HO which is triggered mainly based on signal quality measurement, if a source eNB has extra pieces of information such as residual capacity, load information of each target candidate, HO rejection by a target candidate due to lack of resources can be avoided. In other words, the extra SON (Self-Organizing Network) information will in turn help a source eNB minimise resource wastage due to unsuccessful HO attempts while providing better QoE (Quality of Experience) to a UE.

In a resource constraint target, the luxury of offloading traffic through LWA is always helpful. Hence, before deciding a HO type in terms of whether it involves WT change OR not it is better for a Source eNB to know whether its potential target candidates have connectivity to the same WT or possibly to the same AP that serves a UE in question.
Observation 1:

Getting a Source eNB to know whether each of its target candidate has connectivity to the same WT at the time HO is useful for better resource management and UE experience.

This means it is better for eNBs to include WT connectivity in its neighbour information. Although split bearer option is considered in LWA case where a target can still reset its PDCP (Packet Data Convergence Protocol) after a HO, choosing the target that has connectivity to the same WT is useful as opposed to completely breaking LWA at the time of HO and making WT additions after a HO. This puts extra effort on UE as well as on target in terms of measurement taking and signalling.
Proposal 1:

RAN3 is respectfully requested to explore the benefits of including WT details in Neighbour Information IE.

3 Conclusion and Proposals

This paper Analyses the need for eNBs to have full picture of neighbours in terms of WT connectivity for better resource usage and UE QoE. With its basic Analysis, it further makes the following Observation and proposal:
Observation 1:

Getting a Source eNB to know whether each of its target candidate has connectivity to the same WT at the time HO is useful for better resource management and UE experience.
Proposal 1:

RAN3 is respectfully requested to explore the benefits of including WT details in Neighbour Information IE.

The whole or part of the example embodiments disclosed above can be described as, but not limited to, the following supplementary notes.

(Supplementary note 1) A base station for a communication network, the base station comprising:
 a transceiver configured to communicate with a communication device; and
 a controller configured to perform an automatic neighbour relation operation in relation to at least one Wireless Local Area Network, WLAN;
 wherein the controller is configured to obtain, from at least one of the communication device and a mobility management entity, an address associated with a node of the wireless local area network, WLAN, and to establish a connection with the node of the WLAN using the obtained address.

(Supplementary note 2) The base station according to Supplementary note 1, wherein the controller is configured to control, using the established connection, aggregation of resources for concurrent communications via a cell operated by the base station and via an access point of the WLAN.

(Supplementary note 3) The base station according to Supplementary note 1 or 2, wherein the controller is configured to obtain, from the mobility management entity, the address associated with a node of a WLAN by sending, to the mobility management entity, a signalling message for triggering transfer of the address associated with the node of the WLAN (e.g. an 'eNB Configuration Transfer' message or a 'WT Address Discovery' message).

(Supplementary note 4) The base station according to Supplementary note 1 or 2, wherein the controller is configured to obtain, from the communication device, the address associated with a node of a WLAN by sending, to the communication device, a message to request that the communication device reads the address of the node of the WLAN (reading WLAN information broadcast).

(Supplementary note 5) The base station according to Supplementary note 3 or 4, wherein the signalling message includes an identifier for identifying the WLAN (e.g. a Service Set Identifier, SSID; a Homogenous Extended Service Set Identifier, HESSID; and/or a Basic Service Set Identifier, BSSID).

(Supplementary note 6) The base station according to any one of Supplementary notes 1 to 5, wherein the address comprises a transport network layer, TNL, address.

(Supplementary note 7) A base station for a communication network, the base station comprising:
 a transceiver configured to communicate with a neighbouring base station; and
 a controller configured to obtain, from at least one of the neighbouring base station and an access point of a wireless local area network, WLAN, information indicating that the neighbouring base station has a direct connection with a node of the WLAN.

(Supplementary note 8) The base station according to Supplementary note 7, wherein the controller is further configured to obtain at least one of: information (e.g. a 'WT ID') identifying a node of the WLAN, a list of access points of the WLAN; and an identifier for identifying the WLAN (e.g. a Service Set Identifier, SSID; a Homogenous Extended Service Set Identifier, HESSID; and/or a Basic Service Set Identifier, BSSID).

(Supplementary note 9) A base station for a communication network, the base station comprising:
 a transceiver configured to communicate with a neighbouring base station; and
 a controller configured to obtain, from the neighbouring base station, information indicating that the neighbouring base station has a direct connection with a base station that is operable as a secondary base station, SeNB, in a dual connectivity, DC, arrangement.

(Supplementary note 10) A mobility management entity for a communication network, the mobility management entity comprising:
 a controller configured to obtain, upon request by a base station performing an automatic neighbour relation operation in relation to at least one wireless local area network, WLAN, an address associated with a node of the WLAN; and
 a transceiver configured to send, to the base station, the obtained address associated with the node of the WLAN.

(Supplementary note 11) The mobility management entity according to Supplementary note 10, wherein the request by the base station comprises a signalling message for triggering transfer of the address associated with the node of the WLAN (e.g. an 'eNB Configuration Transfer' message or a 'WT Address Discovery' message).

(Supplementary note 12) The mobility management entity according to Supplementary note 10 or 11, wherein the controller is configured to obtain the address associated with the node of the WLAN from an information service or domain name system node (e.g. using an appropriate Fully Qualified Domain Name, FQDN, procedure and/or an Access Network Query Protocol, ANQP, procedure).

(Supplementary note 13) A communication device for a communication network, the communication device comprising:
a controller configured for obtaining, from an access point of a wireless local area network, WLAN, information identifying an address of a node of the WLAN; and
a transceiver configured to provide the obtained information to the base station as part of an automatic neighbour relation operation in relation to the WLAN.

(Supplementary note 14) The communication device according to Supplementary note 13, wherein the controller is further configured for aggregation of resources for concurrent communications via a cell operated by the base station and via an access point of the WLAN.

(Supplementary note 15) The communication device according to Supplementary note 13 or 14, wherein the transceiver is configured to receive, from the WLAN, an identifier for identifying the WLAN; and to provide the received identifier to the base station in a measurement report.

(Supplementary note 16) The communication device according to Supplementary note 15, wherein the transceiver is configured to receive, from the base station after sending the measurement report, a message to request that the communication device reads the address of a node of the WLAN identified by the identifier; and wherein the controller is configured to perform said obtaining of the address of the node of the WLAN in response to the request message.

(Supplementary note 17) The communication device according to Supplementary note 16, wherein the received message is further configured to request that the communication device reads at least one of: information (e.g. a PLMN-ID) identifying a public land mobile network, PLMN, associated with the WLAN; information identifying that the access point supports LTE-WLAN Aggregation, LWA, functionality (e.g. an 'LWA-Support Indicator'); and information (e.g. a 'WT ID') identifying the node of the WLAN; and wherein the controller is configured to obtain at least one of: the information identifying a PLMN associated with the WLAN; the information identifying that the access point supports LWA functionality; and the information identifying the node of the WLAN.

(Supplementary note 18) An access point for a communication network, the access point comprising:
a transceiver configured to broadcast an address of a node of a wireless local area network, WLAN, to which the access point belongs.

(Supplementary note 19) The access point according to Supplementary note 18, wherein the transceiver is further configured to broadcast at least one of: information (e.g. a PLMN-ID) identifying a public land mobile network, PLMN, associated with the WLAN; information identifying that the access point supports LTE-WLAN Aggregation, LWA, functionality (e.g. an 'LWA-Support Indicator'); and information (e.g. a 'WT ID') identifying the node of the WLAN.

(Supplementary note 20) A system comprising: the base station according to any one of Supplementary notes 1 to 9; the mobility management entity according to any one of Supplementary notes 10 to 12; and a communication device.

(Supplementary note 21) A system comprising: the base station according to any one of Supplementary notes 1 to 9; a mobility management entity; the communication device according to any one of Supplementary notes 13 to 17; and the access point according to Supplementary note 18 or 19.

(Supplementary note 22) A method performed by a base station of a communications network, the method comprising:
performing an automatic neighbour relation operation in relation to at least one Wireless Local Area Network, WLAN;
obtaining, from at least one of a communication device and a mobility management entity, an address associated with a node of the WLAN; and
establishing a connection with the node of the WLAN using the obtained address.

(Supplementary note 23) A method performed by a base station of a communications network, the method comprising:
obtaining, from a neighbouring base station, information indicating that the neighbouring base station has a direct connection with a node of a wireless local area network, WLAN.

(Supplementary note 24) A method performed by a base station of a communications network, the method comprising:
obtaining, from the neighbouring base station, information indicating that the neighbouring base station has a direct connection with a base station that is operable as a secondary base station, SeNB, in a dual connectivity, DC, arrangement.

(Supplementary note 25) A method performed by a mobility management entity of a communications network, the method comprising:
obtaining, upon request by a base station performing an automatic neighbour relation operation in relation to at least one wireless local area network, WLAN, an address associated with a node of the WLAN; and
sending, to the base station, the obtained address associated with the node of the WLAN.

(Supplementary note 26) A method performed by a communication device, the method comprising:
obtaining, from an access point of a wireless local area network, WLAN, information identifying an address of a node of the WLAN; and
providing the obtained information to the base station as part of an automatic neighbour relation operation in relation to the WLAN.

(Supplementary note 27) A method performed by an access node, the method comprising:
broadcasting an address of a node of a wireless local area network, WLAN, to which the access point belongs.

(Supplementary note 28) A computer program product comprising computer implementable instructions for causing a programmable computer device to perform the method according to any one of Supplementary notes 22 to 27.

While the invention has been particularly shown and described with reference to example embodiments thereof, the invention is not limited to these embodiments. It will be understood by those of ordinary skill in the art that various changes in form and details may be made therein without departing from the sprit and scope of the present invention as defined by the claims.

This application is based upon and claims the benefit of priority from United Kingdom Patent Application No. 1608492.3, filed on May 13, 2016, the disclosure of which is incorporated herein in its entirety by reference.

The invention claimed is:

1. A method performed by a base station of a communications network, the method comprising:
    establishing an Xw connection with a WLAN Termination, 'WT', node of a wireless local area network, 'WLAN';
    obtaining, from the WT node, in an Xw Setup Response message or a WT Configuration Update message, information indicating at least one neighbouring base station that has a second Xw connection with the WT node; and
    considering the at least one neighbouring base station to which the received information relates to be a base station to which the WT node is connected.

2. The method according to claim 1, further comprising obtaining, from the WT node, at least one of: information identifying the WT node; a list of access points of the WLAN; and an identifier for identifying the WLAN.

3. The method according to claim 2, wherein the identifier for identifying the WLAN comprises at least one of: a Service Set Identifier, 'SSID'; a Homogenous Extended Service Set Identifier, 'HESSID'; and a Basic Service Set Identifier, 'BSSID'.

4. The method according to claim 1, further comprising performing a handover procedure based on the obtained information.

5. A method performed by a WLAN Termination, 'WT', node of a wireless local area network, 'WLAN', the method comprising:
    establishing an Xw connection with a base station;
    sending, to the base station, in an Xw Setup Response message or a WT Configuration Update message, information indicating at least one neighbouring base station that has a second Xw connection with the WT node;
    whereby the base station considers the at least one neighbouring base station to which the information relates to be a base station to which the WT node is connected.

6. The method according to claim 5, further comprising sending, to the base station, at least one of: information identifying the WT node; a list of access points of the WLAN; and an identifier for identifying the WLAN.

7. The method according to claim 6, wherein the identifier for identifying the WLAN comprises at least one of: a Service Set Identifier, 'SSID'; a Homogenous Extended Service Set Identifier, 'HESSID'; and a Basic Service Set Identifier, 'BSSID'.

8. A base station for a communication network, the base station comprising:
    a base station interface configured to establish an Xw connection with a WLAN Termination, 'WT', node of a wireless local area network, 'WLAN';
    a memory having stored therein program instructions; and
    a controller configured to execute the program instructions stored in the memory and upon execution of the program instructions obtaining, from the WT node, in an Xw Setup Response message or a WT Configuration Update message, information indicating at least one neighbouring base station that has a second Xw connection with the WT node; and
    considering the at least one neighbouring base station to which the received information relates to be a base station to which the WT node is connected.

9. The base station according to claim 8, wherein the controller is further configured to obtain, from the WT node, at least one of: information identifying the WT node, a list of access points of the WLAN; and an identifier for identifying the WLAN.

10. The base station according to claim 9, wherein the identifier for identifying the WLAN comprises at least one of: a Service Set Identifier, 'SSID'; a Homogenous Extended Service Set Identifier, 'HESSID'; and a Basic Service Set Identifier, 'BSSID'.

11. The base station according to claim 8, wherein the controller is further configured to perform a handover procedure based on the obtained information.

12. A WLAN Termination, 'WT', node of a wireless local area network, 'WLAN', the WT node comprising:
    a transceiver configured to send, to a base station, in an Xw Setup Response message or a WT Configuration Update message, information indicating at least one neighbouring base station that has a second Xw connection with the WT node;
    whereby the base station considers the at least one neighbouring base station to which the information relates to be a base station to which the WT node is connected.

* * * * *